United States Patent
Atsuta et al.

(10) Patent No.: US 10,669,416 B2
(45) Date of Patent: Jun. 2, 2020

(54) THERMOPLASTIC RESIN COMPOSITION AND MOLDED ARTICLE IN WHICH SAME IS USED

(71) Applicant: Techno-UMG Co., Ltd., Tokyo (JP)

(72) Inventors: Hiroyuki Atsuta, Yamaguchi (JP); Ichiro Kamata, Yamaguchi (JP)

(73) Assignee: Techno-UMG Co., Ltd., Tokyo (JP)

( * ) Notice: Subject to any disclaimer, the term of this patent is extended or adjusted under 35 U.S.C. 154(b) by 73 days.

(21) Appl. No.: 16/087,888

(22) PCT Filed: Mar. 27, 2017

(86) PCT No.: PCT/JP2017/012253
§ 371 (c)(1),
(2) Date: Sep. 24, 2018

(87) PCT Pub. No.: WO2017/170327
PCT Pub. Date: Oct. 5, 2017

(65) Prior Publication Data
US 2020/0048449 A1    Feb. 13, 2020

(30) Foreign Application Priority Data

Mar. 29, 2016 (JP) .................................. 2016-066618

(51) Int. Cl.
*C08L 51/04* (2006.01)
*C08K 3/04* (2006.01)

(52) U.S. Cl.
CPC ............... *C08L 51/04* (2013.01); *C08K 3/04* (2013.01); *C08K 2201/005* (2013.01); *C08L 2203/30* (2013.01); *C08L 2207/04* (2013.01)

(58) Field of Classification Search
CPC .................................. C08K 3/04; C08L 51/04
See application file for complete search history.

(56) References Cited

U.S. PATENT DOCUMENTS

| | | | |
|---|---|---|---|
| 2003/0175435 A1* | 9/2003 | Harakawa | C08F 265/04 427/385.5 |
| 2008/0317979 A1 | 12/2008 | Itakura et al. | |
| 2013/0113134 A1* | 5/2013 | Derfuss | C08L 51/04 264/211.21 |

FOREIGN PATENT DOCUMENTS

| | | |
|---|---|---|
| DE | 102006049381 A1 | 4/2008 |
| JP | A-2000-212378 A | 8/2000 |
| JP | A-2000-265029 A | 9/2000 |
| JP | A-2000-309639 A | 11/2000 |
| JP | A-2001-139758 A | 5/2001 |
| JP | A-2004-182835 A | 7/2004 |
| JP | A-2006-187875 A | 7/2006 |
| JP | 2006-265545 A | 10/2006 |
| WO | WO-00/24826 A1 | 5/2000 |
| WO | WO-2006/009200 A1 | 1/2006 |
| WO | WO-2014/185452 A1 | 11/2014 |

OTHER PUBLICATIONS

Int'l Search Report of the ISA/JP in PCT/JP2017/012253; dated Jun. 27, 2017; 4 pgs.
European Search Report for European Application No. 17774864.7, dated Aug. 23, 2019, 7 pages.

* cited by examiner

*Primary Examiner* — Jeffrey C Mullis
(74) *Attorney, Agent, or Firm* — Goodwin Procter LLP

(57) ABSTRACT

The thermoplastic resin composition of the present invention contains a thermoplastic resin (A) and carbon black (B), wherein the thermoplastic resin (A) contains a graft copolymer (C) in which a vinyl-based polymer is grafted to a rubber-like polymer, the carbon black (B) has a volume average particle size of secondary particles of 200 nm or more, and a proportion of secondary particles having a particle size of 800 nm or more with respect to the entire secondary particles of less than 20% by volume, and a content of the carbon black (B) is from 0.1 to 3.0 parts by mass with respect to 100 parts by mass of the thermoplastic resin (A).

3 Claims, No Drawings

THERMOPLASTIC RESIN COMPOSITION AND MOLDED ARTICLE IN WHICH SAME IS USED

CROSS-REFERENCE TO RELATED APPLICATIONS

This non-provisional application is a national stage entry of International Patent Application No. PCT/JP2017/012253, filed on Mar. 27, 2017, which claims priority to Japanese Patent Application No. 2016-066618, filed on Mar. 29, 2016, the entire contents of each of which are hereby incorporated by reference.

TECHNICAL FIELD

The present invention relates to a thermoplastic resin composition containing carbon black and a molded article using the same.

Priority is claimed on Japanese Patent Application No. 2016-066618, filed Mar. 29, 2016, the content of which is incorporated herein by reference.

BACKGROUND ART

With the development of technology, the fields of application for resins have been increasingly expanded in recent years, such as parts for vehicles, parts for household electrical appliances, and various industrial materials. Secondary processing technology concerning resin joining is also one of the technologies contributing to the expansion.

As a method of joining the resin, for example, mechanical joining by screws, bolts, or the like; joining by an adhesive such as hot melt adhesives; welding represented by hot plate welding by applying heat for melting resins; vibration welding utilizing frictional heat generated by vibrating a joint portion; laser welding by irradiating a laser beam to a joint portion and utilizing absorption and heat generation at the portion, and the like can be mentioned. Recently, the usefulness of hot plate welding, vibration welding and laser welding has increased from the viewpoints of reduction of processing steps, weight reduction, reduction of environmental burden, and the like.

In hot plate welding, for example, a heated hot plate is pressed against the surfaces to be joined (bonding portions) of each of two resin members for several seconds, and after both of them are melted, they are promptly separated from the hot plate and joined. Hot plate welding is widely used. However, in hot plate welding, a threading phenomenon may occur in which the molten resin is elongated like a thread when the hot plate is separated from the bonding portion of the resin member. When this threading phenomenon becomes conspicuous, the obtained resin joined body will have a poor appearance.

In vibration welding, for example, vibration due to pressure and reciprocating motion is applied to the bonding portions of each of the two resin members, and the resin components of the bonding portions are melted by the frictional heat, thereby joining the two. Vibration welding is an excellent method capable of joining the resin members with each other in an extremely short period of time without heating the resin members. However, in this vibration welding method, a thread burr phenomenon may occur in which the molten resin protrudes like a thread on the outside of the joint portion. When this thread burr phenomenon becomes conspicuous, the obtained resin joined body will have a poor appearance.

In laser welding, usually two materials, that is, a "transmitting material" that transmits laser light and an "absorbing material" that absorbs laser light are joined. For example, when the absorbing material and the transmitting material are placed by bringing their respective bonding portions into contact and laser light is irradiated to the material contact interface from the transmitting material side in a non-contact manner, the irradiated laser light directly passes through the transmitting material, reaches the surface of the absorbing material, and is absorbed. The light energy absorbed by the surface of the absorbing material is converted into heat and melts the bonding portion. In addition, the heat of fusion is thermally transferred to the transmitting material and melts the bonding portion of the transmitting material. Thereafter, the melted bonding portions of each of the absorbing material and the transmitting material are solidified and welded with cooling. The resin joined body obtained through such a process is excellent in strength, airtightness, and appearance (no burr generation, or the like). In addition, laser welding also has features such as the following: good working environment; and when some components are incorporated in the resin member to be joined, there is little damage to the incorporated components. However, in this method, if the laser light to be irradiated is too strong, the amount of heat generated by the resin will increase, thereby causing poor appearance such as foaming, scorching, discoloration and the like. On the other hand, if the laser light to be irradiated is too weak, the joining strength decreases and, in some cases, problems such as insufficient welding may occur. Therefore, when performing laser welding, it is very important to control the amount of heat generated by the resin within an appropriate range.

Incidentally, a molded article obtained from a thermoplastic resin is often used in a state colored with a pigment (colored molded article). From the viewpoint of product design properties, the color tone of the colored molded article is regarded as very important. Although the importance of color tone is also high in parts for vehicles and the like, since the design is preferred in the market, the demand for black color in particular tends to increase every year.

Since carbon black which is a representative of a black colorant has high absorptivity of laser light, it is efficient in increasing the amount of heat generation and melting the resin.

However, when the added amount of carbon black is excessively increased, since the amount of heat generation becomes excessive, it is likely to cause poor appearance such as foaming, scorching, discoloration and the like at the time of irradiation with laser light as described above. In other words, if the added amount of carbon black is increased in order to obtain a deep black tint, the appearance after laser welding deteriorates conversely. Therefore, it is very difficult to achieve both the color tone (especially the black tint) and the appearance after laser welding.

Patent Document 1 discloses a colored styrene-based resin molded body excellent in laser marking properties and molded article appearance (surface gloss), which contains a styrene-based resin and a colorant, and the number of the colorant present in the molded body as secondary particles of 0.1 to 10 μm is from 100 to 20,000 particles/m².

However, in this document, there is no description concerning compatibility between the color tone (particularly the black tint) of a molded article and the appearance after laser welding. In the colored styrene-based resin molded body disclosed in Patent Document 1, there is a technical problem as a laser welding material from the viewpoints of the balance between the black tint and laser light absorption and the impact resistance.

Patent Document 2 discloses a thermoplastic resin composition for a lamp housing obtained by combining, at a specific ratio, a rubber reinforced resin composed of a rubber-reinforced copolymer resin (obtained by polymerizing a vinyl-based monomer containing an aromatic vinyl compound and a vinyl cyanide compound in the presence of a rubbery polymer having a gel content of 70% or more) or a composition of the aforementioned rubber-reinforced copolymer resin and a (co)polymer of the vinyl-based monomer, and a copolymer containing a maleimide-based monomer unit and/or a (co)polymer of α-methylstyrene, in order to improve defective phenomena occurring during vibration welding, hot plate welding or laser welding in joining a lamp housing and another member.

However, in this document, there is no description concerning compatibility between the color tone (particularly the black tint) of a molded article and the appearance after laser welding. The composition disclosed in Patent Document 2 cannot sufficiently satisfy the level of demand for the black tint.

CITATION LIST

Patent Documents

Patent Document 1: Japanese Unexamined Patent Application, First Publication No. 2000-309639
Patent Document 2: Japanese Unexamined Patent Application, First Publication No. 2004-182835

SUMMARY OF INVENTION

Technical Problem

An object of the present invention is to provide a thermoplastic resin composition capable of obtaining a molded article excellent in color tone, impact resistance and weld appearance.

In addition, another object of the present invention is to provide a molded article excellent in color tone, impact resistance and weld appearance.

Solution to Problem

As a result of intensive studies, the inventors of the present invention have found that the above-mentioned problems can be solved by blending carbon black having a specific secondary particle size distribution in a thermoplastic resin composition containing a rubber-containing graft copolymer, thereby arriving at the present invention.

That is, the present invention is summarized as follows.
[1] A thermoplastic resin composition containing a thermoplastic resin (A) and carbon black (B), characterized in that
the aforementioned thermoplastic resin (A) contains a graft copolymer (C) in which a vinyl-based polymer is grafted to a rubber-like polymer,
the aforementioned carbon black (B) has a volume average particle size of secondary particles of 200 nm or more, and a proportion of secondary particles having a particle size of 800 nm or more with respect to the entire secondary particles of less than 20% by volume, and
a content of the aforementioned carbon black (B) is from 0.1 to 3.0 parts by mass with respect to 100 parts by mass of the aforementioned thermoplastic resin (A).
[2] The thermoplastic resin composition disclosed in [1], wherein when a particle size at which a cumulative value in a particle size distribution based on volume of the aforementioned carbon black (B) becomes 10% is defined as a 10% cumulative particle size (d10), a particle size at which the aforementioned cumulative value becomes 50% is defined as a 50% cumulative particle size (d50), and a particle size at which the aforementioned cumulative value becomes 90% is defined as a 90% cumulative particle size (d90), M obtained by the following formula (1) satisfies the following formula (2):

$$M = (d90 - d10)/d50 \tag{1};$$

$$1.5 \leq M \leq 2.5 \tag{2}.$$

[3] A molded article using the thermoplastic resin composition disclosed in [1] or [2].

Advantageous Effects of Invention

According to the thermoplastic resin composition of the present invention, a molded article excellent in color tone, impact resistance and weld appearance can be obtained.

The molded article of the present invention is excellent in color tone, impact resistance and weld appearance.

DESCRIPTION OF EMBODIMENTS

Hereinafter, the present invention will be described in detail.

It should be noted that in the following description, the term "molded article" means one obtained by molding the thermoplastic resin composition of the present invention. Further, in the following description, unless otherwise specified, the expression "excellent color tone" means that the black tint of the molded article is deep (dark). In addition, the expression "excellent weld appearance" means that there is no poor appearance in the welded portion after welding the molded article by laser welding, vibration welding or hot plate welding. The expression "poor appearance" means scorching, discoloration or insufficient welding in the welded portion in the case of laser welding, means thread burr in the welded portion in the case of vibration welding, and means threading in the welded portion in the case of hot plate welding.

Thermoplastic Resin Composition

A thermoplastic resin composition of the present invention contains a thermoplastic resin (A) and carbon black (B).

If necessary, the thermoplastic resin composition of the present invention may contain other additives in addition to the thermoplastic resin (A) and the carbon black (B) within a range that does not significantly impair the effects of the present invention.

Thermoplastic Resin (A)

The thermoplastic resin (A) contains a graft copolymer (C).

The thermoplastic resin (A) may be composed of only the graft copolymer (C) or may further contain another thermoplastic resin (D) other than the graft copolymer (C). From the viewpoint of balance between impact resistance and fluidity, it is preferable that the thermoplastic resin (A) contains another thermoplastic resin (D).

The thermoplastic resin (A) is preferably composed of 20 to 100% by mass of the graft copolymer (C) and 0 to 80% by mass of the other thermoplastic resin (D), and more preferably composed of 20 to 60% by mass of the graft copolymer (C) and 40 to 80% by mass of the another thermoplastic resin (D) (provided that the total of the graft copolymer (C) and the another thermoplastic resin (D) is 100% by mass). When the content of the graft copolymer (C) in the thermoplastic resin (A) is equal to or more than the lower limit value of the above range, the impact resistance and weld appearance of the molded article are more excellent.

Graft Copolymer (C)

The graft copolymer (C) is one in which a vinyl-based polymer is grafted to a rubber-like polymer.

Although the rubber-like polymer constituting the graft copolymer (C) is not particularly limited, examples thereof include a butadiene-based rubber such as a polybutadiene, a styrene-butadiene copolymer, and an acrylic acid ester-butadiene copolymer; a conjugated diene-based rubber such as a styrene-isoprene copolymer; an acrylic rubber such as polybutyl acrylate; an olefin-based rubber such as an ethylene-propylene copolymer; and a silicone-based rubber such as a polyorganosiloxane. Any one of these can be used alone or in combination of two or more types thereof. It should be noted that these rubber-like polymers can be used from monomers. The rubber-like polymer may have a composite rubber structure or a core/shell structure.

The rubber-like polymer constituting the graft copolymer (C) is preferably a butadiene-based rubber, an acrylic rubber, or a composite rubber-like polymer thereof, from the viewpoint of good balance between color tone and impact resistance.

The gel content of the above rubber-like polymer is preferably from 50 to 99% by mass, more preferably from 60 to 95% by mass, and particularly preferably from 70 to 85% by mass. When the gel content of the rubber-like polymer is within the above range, the impact resistance of the molded article obtained from the thermoplastic resin composition is more excellent.

More specifically, the gel content of the rubber-like polymer is measured by the following method.

The weighed rubber-like polymer is dissolved in an appropriate solvent at room temperature (23° C.) over the course of 20 hours, centrifuged, and then the supernatant is removed by decantation. The remaining insoluble matter is dried at 60° C. for 24 hours, and then weighed. The proportion (% by mass) of the mass of the insoluble matter with respect to the mass of the rubber-like polymer first weighed is determined, and this proportion is taken as the gel content of the rubber-like polymer. As a solvent used for dissolving the rubber-like polymer, for example, toluene or acetone can be used.

Typically, the rubber-like polymer is in a granular form. It exists in a granular form even in the thermoplastic resin composition.

The average particle size of the rubber-like polymer is not particularly limited, but is preferably from 0.1 to 1 μm, and more preferably from 0.2 to 0.5 μm. When the average particle size of the rubber-like polymer is equal to or more than the lower limit value of the above range, the impact resistance is more excellent, and when it is equal to or less than the upper limit value of the above range, the color tone is more excellent.

The average particle size of the rubber-like polymer is a volume average particle size, and it is obtained from the volume-based particle size distribution measured by a dynamic light scattering method. For example, with respect to a latex of a rubber-like polymer, a volume-based particle size distribution is measured using a particle size distribution measuring instrument (Nanotrac) by a dynamic light scattering method, and the volume average particle size of the rubber-like polymer can be calculated from the obtained particle size distribution.

The vinyl-based polymer constituting the graft copolymer (C) is composed of structural units based on vinyl-based monomers.

The vinyl-based monomer is not particularly limited, but aromatic vinyl compounds, alkyl (meth)acrylates, vinyl cyanide compounds and the like are preferable. The term "alkyl (meth)acrylates" is a generic term for alkyl acrylates and alkyl methacrylates. Examples of the aromatic vinyl compound include styrene, α-methylstyrene and p-methylstyrene. Examples of alkyl (meth)acrylates include methyl methacrylate, ethyl methacrylate, 2-ethylhexyl methacrylate, methyl acrylate, ethyl acrylate, n-butyl acrylate, isobutyl acrylate and t-butyl acrylate. As the vinyl cyanide compound, for example, acrylonitrile, methacrylonitrile and the like can be mentioned. These vinyl-based monomers can be used alone or as a mixture of two or more types thereof.

Among the above-mentioned vinyl-based monomers, it is preferable to use styrene in combination with acrylonitrile since the impact resistance of the molded article is further improved. That is, it is preferable that the vinyl-based polymer has a structural unit based on styrene and a structural unit based on acrylonitrile.

In the graft copolymer (C), although the mass ratio of the rubber-like polymer and the vinyl-based polymer is not particularly limited, with respect to the total mass of the graft copolymer (C), it is preferable that the rubber-like polymer is from 10 to 80% by mass and the vinyl-based polymer is from 20 to 90% by mass, and it is particularly preferable that the rubber-like polymer is from 30 to 70% by mass and the vinyl-based polymer is from 30 to 70% by mass (provided that the total of the rubber-like polymer and the vinyl-based polymer is 100% by mass). When the mass ratio of the rubber-like polymer and the vinyl-based polymer is within the above range, the impact resistance of the molded article is further improved.

Production Method of Graft Copolymer (C)

The graft copolymer (C) is obtained by grafting a vinyl-based polymer to a rubber-like polymer.

As a method of grafting the vinyl-based polymer to the rubber-like polymer, for example, a method of polymerizing (graft polymerizing) a vinyl-based monomer in the presence of a rubber-like polymer can be mentioned. The graft copolymer (C) obtained in this manner has a form in which a vinyl-based polymer obtained by polymerizing a vinyl-based monomer is grafted to a rubber-like polymer.

Although the method for performing graft polymerization is not particularly limited, emulsion polymerization is preferable since it can be controlled so that the reaction proceeds stably. More specifically, a method in which vinyl-based monomers are charged all together in an aqueous dispersion of a rubber-like polymer and then polymerized; a method in which a part of the vinyl-based monomers is charged first in the aqueous dispersion of the rubber-like polymer, and the remainder is added dropwise to the polymerization system while being polymerized as needed; and a method in which the whole amount of the vinyl-based monomers is added dropwise to the aqueous dispersion of the rubber-like polymer and the polymerization is carried out as needed, and the like can be mentioned. The polymerization of the vinyl-based monomers may be carried out in a single stage or may be carried out in two or more separate stages. When it is carried out in two or more separate stages, it is also possible to carry out by changing the type and composition ratio of the vinyl-based monomers in each stage.

Although the mass ratio of the rubber-like polymer and the vinyl-based monomer is not particularly limited, with respect to the total mass of the rubber-like polymer and the vinyl-based type monomer, it is preferable that the rubber-like polymer is from 10 to 80% by mass and the vinyl-based monomer is from 20 to 90% by mass, and it is particularly preferable that the rubber-like polymer is from 30 to 70% by mass and the vinyl-based monomer is from 30 to 70% by mass (provided that the total of the rubber-like polymer and the vinyl-based monomer is 100% by mass). When graft polymerization is performed with such a mass ratio, the impact resistance of the molded article is further improved.

Emulsion polymerization is usually carried out using a radical polymerization initiator and an emulsifier. For example, a vinyl-based monomer is added to an aqueous dispersion of a rubber-like polymer, and the vinyl-based monomer is subjected to radical polymerization in the presence of a radical polymerization initiator and an emulsifier.

In performing radical polymerization, various known chain transfer agents may be added in order to control the molecular weight and the graft ratio of the resulting graft copolymer (C).

The polymerization conditions for the radical polymerization are not particularly limited, and, for example, polymerization conditions of 50 to 100° C. for 1 to 10 hours can be mentioned.

Examples of the radical polymerization initiator include peroxides, azo-based initiators and redox type initiators combining an oxidizing agent and a reducing agent. Of these, redox type initiators are preferable, and a sulfoxylate-based initiator in which ferrous sulfate, disodium ethylenediaminetetraacetate, sodium formaldehyde sulfoxylate and hydroperoxide are combined is particularly preferable.

Although the emulsifier is not particularly limited, since the stability of the latex at the time of radical polymerization is excellent and the polymerization rate can be increased, various carboxylates such as sodium sarcosinate, potassium fatty acids, sodium fatty acids, dipotassium alkenyl succinate and rosin acid soaps are preferred. Among these, dipotassium alkenyl succinate is preferable because gas generation can be suppressed when the obtained graft copolymer (C) and a thermoplastic resin composition containing this are molded at a high temperature.

The graft copolymer (C) obtained by performing graft polymerization as described above is usually in a latex state.

As a method for recovering the graft copolymer (C) from the latex of the graft copolymer (C), for example, a wet process of introducing a latex of the graft copolymer (C) into hot water in which a coagulating agent is dissolved, thereby coagulating in a slurry state; and a spray drying method in which the graft copolymer (C) is semi-directly recovered by spraying a latex of the graft copolymer (C) in a heated atmosphere, and the like can be mentioned.

Examples of the coagulating agent used in the wet process include inorganic acids such as sulfuric acid, hydrochloric acid, phosphoric acid and nitric acid; and metal salts such as calcium chloride, calcium acetate and aluminum sulfate, which are selected depending on the emulsifier used in the polymerization. For example, when only a carboxylate soap such as a fatty acid soap or a rosin acid soap is used as an emulsifier, one or more of the above-mentioned coagulating agents can be used. In the case of using an emulsifier having a stable emulsifying capacity even in an acidic region such as sodium alkylbenzene sulfonate as an emulsifier, a metal salt is suitable as a coagulating agent.

When a wet process is used, the graft copolymer (C) in the form of a slurry is obtained. As a method for obtaining the dried graft copolymer (C) from the graft copolymer (C) in a slurry form, a method in which the remaining emulsifier residue is first eluted into water and washed, then the slurry is centrifuged or dehydrated with a press dehydrator or the like, followed by drying with a flash dryer or the like; a method of simultaneously conducting dehydration and drying in a compression dehydrator, an extruder or the like, and the like can be mentioned. By such a method, a dried graft copolymer (C) in the form of a powder or particulate is obtained.

Although the washing condition is not particularly limited, it is preferable to wash under conditions so that the amount of the emulsifier residue contained in the graft copolymer (C) after drying is within a range of 0.5 to 2% by mass with respect to the total mass (100% by mass) of the graft copolymer (C). When the emulsifier residue in the graft copolymer (C) is equal to or more than 0.5% by mass, the fluidity of the resulting graft copolymer (C) and the thermoplastic resin composition containing this tends to further improve. On the other hand, if the emulsifier residue in the graft copolymer (C) is equal to or less than 2% by mass, it is possible to suppress gas generation when the thermoplastic resin composition is molded at a high temperature. The amount of emulsifier residue can be adjusted by, for example, washing time or the like.

The drying temperature may be, for example, from 50 to 90° C.

It should be noted that it is also possible not to recover but send the graft copolymer (C) discharged from a compression dehydrator or extruder directly to an extruder or molding machine for producing a resin composition to form a molded article.

Other Thermoplastic Resin (D)

The other thermoplastic resin (D) is not particularly limited, but examples thereof include acrylonitrile-styrene copolymers (AS resins), acrylonitrile-α-methylstyrene copolymers (αSAN resins), styrene-maleic anhydride copolymers, acrylonitrile-styrene-N-substituted maleimide terpolymers, styrene-maleic anhydride-N-substituted maleimide terpolymers, acrylonitrile-butadiene-styrene copolymers (ABS resins), acrylonitrile-styrene-alkyl (meth)acrylate copolymers (ASA resins), acrylonitrile-ethylene-propylene-diene-styrene copolymers (AES resins), polymethylmethacrylates, polycarbonate resins, polybutylene terephthalates (PBT resins), polyethylene terephthalates (PET resins), polyvinyl chlorides, polyolefins such as polyethylenes and polypropylenes, styrene-based elastomers such as styrene-butadiene-styrene copolymers (SBS), styrene-butadiene copolymers (SBR), hydrogenated SBS and styrene-isoprene-styrene copolymers (SIS), various olefin-based elastomers, various polyester-based elastomers, polystyrenes, methyl methacrylate-styrene copolymers (MS resins), acrylonitrile-styrene-methyl methacrylate copolymers, polyacetal resins, modified polyphenylene ethers (modified PPE resins), ethylene-vinyl acetate copolymers, polyphenylene sulfides (PPS resins), polyethersulfones (PES resins), polyether ether ketones (PEEK resins), polyarylates, liquid crystalline polyester resins and polyamide resins (for example, nylon). These other thermoplastic resins (D) may be used alone, or two or more types thereof may be used in combination.

Carbon Black (B)

Examples of the carbon black (B) include a channel black type, a furnace black type, a lamp black type, a thermal black type, a Ketjen black type and a naphthalene black type. Any one of these can be used alone or in combination of two or more types thereof.

The carbon black (B) may be one in which the particle surface is subjected to a secondary treatment.

Examples of the secondary treatment include addition of a surface functional group by an oxidation treatment, graphitization due to a crystal structure by a heat treatment under an inert atmosphere, and an activation treatment with water vapor or carbon dioxide gas. Examples of the oxidation treatment include a treatment with any one of ozone, nitric acid, nitrous acid, sodium hypochlorite and hydrogen peroxide. By the oxidation treatment, acidic functional groups such as carboxyl groups and phenolic hydroxyl groups are formed on the carbon black surface, and the wettability and dispersibility of the carbon black surface are improved. Examples of the heating condition for the heat treatment include a condition of 800 to 2000° C. for 1 to 120 minutes.

The carbon black (B) usually exists as secondary particles. The secondary particles are particles having a shape in which spherical primary particles are agglomerated.

In the carbon black (B), the volume average particle size of the secondary particles is equal to or more than 200 nm, and the proportion of the secondary particles having a particle size of 800 nm or more with respect to the entire secondary particles is less than 20% by volume. If the volume average particle size of the secondary particles is less than 200 nm or the proportion of the secondary particles having a particle size of 800 nm or more is 20% by volume or more, color tone and laser weldability may be insufficient.

Although the upper limit of the volume average particle size of the secondary particles of the carbon black (B) is not particularly limited as long as the proportion of the secondary particles having a particle size of 800 nm or more is less than 20% by volume, it is typically 600 nm or less.

The lower limit of the proportion of the secondary particles having a particle size of 800 nm or more is not particularly limited, and may be 0% by mass.

Each of the volume average particle size and the proportion of the secondary particles having a particle size of 800 nm or more with respect to the entire secondary particles can be obtained from the particle size distribution based on the volume of the secondary particles measured by a dynamic light scattering method. The particle size distribution based on the volume of the secondary particles can be measured, for example, for a dispersion liquid in which the carbon black (B) is dispersed in a dispersion medium (N-methylpyrrolidone) by using a particle size distribution measuring instrument (Nanotrac) by a dynamic light scattering method. Details are as described in the examples.

The carbon black (B) is preferably such that when a particle size at which a cumulative value in the particle size distribution based on the volume of the secondary particles becomes 10% is defined as a 10% cumulative particle size (d10), a particle size at which the aforementioned cumulative value becomes 50% is defined as a 50% cumulative particle size (d50), and a particle size at which the aforementioned cumulative value becomes 90% is defined as a 90% cumulative particle size (d90), M obtained by the following formula (1) satisfies the following formula (2).

$$M=(d90-d10)/d50 \quad (1);$$

$$1.5 \le M \le 2.5 \quad (2).$$

When M exceeds 1.5, color tone and laser weldability tend to be more excellent. When M is less than 2.5, the color tone tends to be more excellent.

It is more preferable that M satisfies the formula: $1.5 \le M \le 2.0$.

The method of measuring the particle size distribution based on the volume of the secondary particles is as described above.

The content of the carbon black (B) in the thermoplastic resin composition is from 0.1 to 3.0 parts by mass, preferably from 0.3 to 2.0 parts by mass, and more preferably from 0.5 to 1.0 part by mass with respect to 100 parts by mass of the thermoplastic resin (A).

When the content of the carbon black (B) is equal to or more than the above lower limit value, the color tone of the molded article obtained from the thermoplastic resin composition is excellent. Further, sufficient joining strength can be obtained by laser welding.

When the content of the carbon black (B) is equal to or less than the above upper limit value, scorching or discoloration is unlikely to occur at the time of laser welding, and the weld appearance is excellent. In addition, the weld appearance tends to be excellent even by vibration welding and hot plate welding.

The total content of the thermoplastic resin (A) and the carbon black (B) in the thermoplastic resin composition is preferably from 70 to 100% by mass, and more preferably from 80 to 100% by mass, with respect to the total mass (100% by mass) of the thermoplastic resin composition. When the total content of the thermoplastic resin (A) and the carbon black (B) is equal to or more than the above lower limit value, the color tone, impact resistance and weld appearance of the molded article are more excellent.

Other Additives

Examples of the other additives include various stabilizers such as antioxidants and light stabilizers, lubricants, plasticizers, mold releasing agents, dyes, pigments, antistatic agents, flame retardants, inorganic fillers and metal powders.

The content of the other additives is appropriately set according to the types of the additives, and is not particularly limited, but it is preferably 10 parts by mass or less, and may be 0 parts by mass, with respect to 100 parts by mass of the thermoplastic resin (A).

Method for Producing Thermoplastic Resin Composition

The thermoplastic resin composition of the present invention can be produced, for example, by mixing and dispersing the thermoplastic resin (A), the carbon black (B), and other additives as necessary, using a V-type blender, a Henschel mixer or the like, and melting and kneading the thus obtained mixture with a melt kneader such as a screw type extruder, a Banbury mixer, a pressure kneader and a mixing roll. Further, if necessary, the melt-kneaded product may be pelletized using a pelletizer or the like. The melt-kneading temperature may be, for example, from 180 to 260° C.

Actions and Effects

In the thermoplastic resin composition of the present invention described above, since the thermoplastic resin (A) and the carbon black (B) are contained, the thermoplastic resin (A) contains the graft copolymer (C), the volume average particle size of the secondary particles of the carbon black (B) is 200 nm or more, the proportion of the secondary particles having a particle size of 800 nm or more with respect to the entire secondary particles is less than 20% by volume, and the content of the carbon black (B) is from 0.1 to 3.0 parts by mass with respect to 100 parts by mass of the thermoplastic resin (A), when formed into a molded article, it exhibits sufficient impact resistance and excellent color tone (particularly the black tint) as a resin member. In addition, this molded article can be welded by laser welding, vibration welding or hot plate welding, and the welded portion is excellent in appearance and can exhibit sufficient joining strength.

In the thermoplastic resin composition of the present invention, the Charpy impact strength of a molded article (1) formed from the thermoplastic resin composition of the present invention is preferably 6 kJ/m$^2$ or more, and more preferably 8 kJ/m$^2$ or more. When the Charpy impact strength is equal to or more than the above lower limit value, the impact resistance is sufficiently excellent.

The "molded article (1)" is a rod-shaped molded article having a length of 80 mm, a width of 10 mm and a thickness of 4 mm, which is formed by injection molding of a thermoplastic resin composition.

The "Charpy impact strength" is a value measured in accordance with ISO 179-1: 2000 for the molded article (1) under the conditions of edgewise impact, notched, and an atmosphere of 23° C.

In the thermoplastic resin composition of the present invention, a color tone L* of a molded article (2) formed from the thermoplastic resin composition of the present invention is preferably 32 or less, and more preferably 30 or less. When the color tone L* is equal to or less than the above upper limit value, the black tint of the molded article is sufficiently deep and the color tone is excellent.

The "molded article (2)" is a plate-shaped molded article having a length of 100 mm, a width 100 mm and a thickness of 2 mm, which is formed by injection molding of a thermoplastic resin composition by an injection molding machine under the conditions of a cylinder temperature of 260° C., a mold temperature of 60° C. and an injection rate of 20 g/sec.

The "color tone L*" is a lightness measured by a colorimeter for the molded article (2).

Molded Article

The molded article of the present invention uses the thermoplastic resin composition of the present invention. More specifically, it is obtained by molding the thermoplastic resin composition of the present invention and includes the thermoplastic resin composition of the present invention.

The molded article of the present invention can be produced by molding the thermoplastic resin composition of the present invention.

As a molding method, a known molding method can be used, and examples thereof include an injection molding method, a press molding method, an extrusion molding method, a vacuum forming method and a blow molding method.

The molded article of the present invention can be welded by laser welding, vibration welding, hot plate welding or the like. For example, a resin joined body can be obtained by welding the molded articles of the present invention, or the molded article of the present invention and another resin molded article by laser welding, vibration welding or hot plate welding. Such a resin joined body is excellent in the appearance and joining strength of the welded portion.

In laser welding, as described above, usually two materials, that is, a transmitting material that transmits laser light and an absorbing material that absorbs laser light are joined. Since the molded article of the present invention contains carbon black, it is usually used as an absorbing material in laser welding and is welded to another resin molded article (transmitting material).

Examples of applications of the molded article of the present invention and the resin joined body using the same include parts for vehicles such as lighting equipment, interior parts and exterior parts, office automation (OA) equipment, parts for household electrical appliances, medical instruments and various industrial materials, and lighting equipment for vehicles is preferable.

EXAMPLES

Specific examples will be shown below. However, the present invention is not limited to the following examples. It should be noted that in the following examples, "%" and "parts" are on a mass basis unless otherwise specified.

Various measurements and evaluation methods in the following examples and comparative examples are as follows.

Evaluation of Impact Resistance

A test piece (a rod-shaped molded article having a length of 80 mm, a width of 10 mm and a thickness of 4 mm) was prepared from a pelletized thermoplastic resin composition by an injection molding machine (manufactured by Toshiba Machine Co., Ltd.). The Charpy impact strength of this test piece was measured in accordance with ISO 179-1: 2000, under the conditions of edgewise impact, notched, and an atmosphere of 23° C.

Evaluation of Appearance After Laser Welding

Using a 4 ounce injection molding machine (manufactured by The Japan Steel Works, Ltd.), a plate-shaped test piece (molded article) having a length of 100 mm, a width 100 mm and a thickness of 2 mm was prepared from a pelletized thermoplastic resin composition produced in each example under the conditions of a cylinder set temperature of 260° C., a mold temperature of 60° C. and an injection rate of 20 g/sec, and this was used as an absorbing material.

A transmitting material was prepared by the same procedure as that of the absorbing material except that the resin used was changed from the pelletized thermoplastic resin composition produced in each example to the pelletized acrylic resin.

The absorbing material and the transmitting material were superimposed, and the laser light was irradiated from the transmitting material side using a NOVOLAS-C type laser welding machine (manufactured by Leister Technologies AG) under conditions of an output of 3 W, a focal spot size of 2 mm, a scanning speed of 20 mm/sec and a welding length of 30 mm, and welded to the absorbing material to obtain a joined body. Thereafter, the weld appearance of the joined surface of the joined body was visually observed and evaluated according to the following criteria.

A: No foaming was observed.
B: Foaming was partially observed.
C: Either foaming was observed all over, or scorching was observed.

Evaluation of Appearance After Vibration Welding

A flat plate molded article (trapezoidal shape, width 70: mm, short side: 110 mm, long side: 160 mm) having a thickness of 2 mm was obtained by injection molding from a pelletized thermoplastic resin composition produced in each example.

The obtained flat plate molded article and an evaluation lens were vibration welded to obtain a joined body. As the evaluation lens, a polymethyl methacrylate (PMMA) resin (Acrypet VH4 manufactured by Mitsubishi Rayon Co., Ltd.) molded into a 3 mm sheet with a rib (trapezoidal shape with a width of 70 mm, a short side of 110 mm and a long side of 160 mm; rib with a height of 10 mm, a short side of 100 mm and a long side of 150 mm) by injection molding was used. Vibration welding was carried out using a BRANSON VIBRATION WELDER 2407 manufactured by Emerson Japan, Ltd. under the conditions of an amplitude of 1 mm, a pressure of 0.3 MPa and a sinking amount of 1.5 mm.

The number of thread burrs produced by melting and joining at the time of vibration welding was visually observed and evaluated according to the following criteria.

A: 0 or more and less than 15.
B: 15 or more and less than 20.
C: 20 or more.

Evaluation of Appearance After Hot Plate Welding

A test sheet (25 mm×100 mm×3 mm) was obtained by injection molding from a pelletized thermoplastic resin composition produced in each example.

The obtained test sheet was brought into contact with a hot plate heated to 220° C. for 12 seconds and then separated horizontally, and the number of threads of 5 mm or more at that time was visually observed and evaluated according to the following criteria.

A: 0 or more and less than 5.
B: 5 or more and less than 15.
C: 15 or more.

Evaluation of Color Tone

A color tone (L*) was measured with a colorimeter using the same test piece as used for evaluating the appearance after laser welding. The smaller the value of L*, the deeper (darker) the black tint of the molded article.

Measurement of Volume Average Particle Size of Secondary Particles of Carbon Black (B), Proportion of Secondary Particles Having Particle Size of 800 nm or More, and Value of M A 0.04% dispersion liquid was prepared by dispersing carbon black (B) in N-methylpyrrolidone, and the particle size distribution based on volume was measured by a dynamic light scattering method using a Nanotrac UPA-EX 150 manufactured by Nikkiso Co., Ltd. to determine the volume average particle size.

Further, from the volume-based particle size distribution described above, the proportion (% by volume) of secondary particles having a particle size of 800 nm or more with respect to the entire secondary particles was determined.

In addition, in the volume-based particle size distribution described above, a particle size at which the cumulative value becomes 10% was determined as a 10% cumulative particle size (d10), a particle size at which the cumulative value becomes 50% was determined as a 50% cumulative particle size (d50), and a particle size at which the cumulative value becomes 90% was determined as a 90% cumulative particle size (d90), and the value of M was calculated from the above formula (1).

Measurement of Volume Average Particle Size of Polymer in Latex

The volume-based particle size distribution was measured by a dynamic light scattering method using the Nanotrac UPA-EX 150 manufactured by Nikkiso Co., Ltd. to determine the volume average particle size.

Measurement of Gel Content of Rubber-Like Polymer

The weighed rubber-like polymer was dissolved in toluene at room temperature (23° C.) over the course of 20 hours, centrifuged, and then the supernatant was removed by decantation. The remaining insoluble matter was dried at 60° C. for 24 hours, and then weighed. The proportion (%) of the mass of the insoluble matter with respect to the mass of the rubber-like polymer first weighed was determined, and this proportion was taken as the gel content of the rubber-like polymer.

Production of Acid Group-Containing Copolymer Latex

Production Example 1: Production of Acid Group-Containing Copolymer Latex (K)

200 parts of ion-exchanged water, 2 parts of potassium oleate, 4 parts of sodium dioctyl sulfosuccinate, 0.003 parts of ferrous sulfate heptahydrate, 0.009 parts of disodium ethylenediaminetetraacetate and 0.3 parts of sodium formaldehyde sulfoxylate were charged into a reaction vessel fitted with a reagent injection container, a cooling tube, a jacket heater and a stirrer under a nitrogen gas stream, and the temperature was raised to 60° C. From the point at which the temperature reached 60° C., a mixture composed of 85 parts of n-butyl acrylate, 15 parts of methacrylic acid, and 0.5 parts of cumene hydroperoxide was added dropwise in a continuous manner over the course of 120 minutes. Following completion of the dropwise addition, aging was further carried out for 2 hours in a state where the temperature was maintained at 60° C. to obtain an acid group-containing copolymer latex (K) having a solid content of 33%, a polymerization conversion rate of 96%, and a volume average particle size of the acid group-containing copolymer of 120 nm.

Graft Copolymer (C)

Production Example 2: Production of Graft Copolymer (C-1)

150 parts of ion-exchanged water, 50 parts of polybutadiene latex (volume average particle size: 0.2 μm, gel content: 84%) in terms of solid content, 1 part of disproportionated potassium rosinate and 0.03 parts of potassium hydroxide were charged into a reaction vessel fitted with a reagent injection container, a cooling tube, a jacket heater and a stirrer, and after heating to 60° C., 0.007 parts of ferrous sulfate heptahydrate, 0.1 parts of sodium pyrophosphate and 0.3 parts of crystalline glucose were added thereto. Subsequently, a mixed solution composed of 15 parts of acrylonitrile, 35 parts of styrene, 0.4 parts of cumene hydroperoxide and 0.5 parts of t-dodecyl mercaptan was added dropwise over the course of 120 minutes and polymerized. Following completion of the dropwise addition, a state at a temperature of 70° C. was held for 60 minutes, and then 0.05 parts of cumene hydroperoxide was added thereto. The state at a temperature of 70° C. was further held for 30 minutes, followed by cooling, to obtain a latex of a polybutadiene-based graft copolymer (C-1) in which acrylonitrile and styrene were graft polymerized to polybutadiene.

Subsequently, an antioxidant was added to the latex, 150 parts of a 1% sulfuric acid aqueous solution was heated to 60° C., and 100 parts of the latex of the graft copolymer (C-1) was gradually added dropwise thereinto and solidified. Further, the precipitate was separated, dehydrated, washed, and then dried to obtain a graft copolymer (C-1).

Production Example 3: Production of Graft Copolymer (C-2)

2.0 parts of a polybutadiene latex (volume average particle size: 200 nm) in terms of solid content, 0.8 parts of dipotassium alkenyl succinate and 190 parts of ion exchanged water were charged and mixed in a reaction vessel fitted with a reagent injection container, a cooling tube, a jacket heater and a stirrer. Subsequently, a mixture composed of 48.0 parts of n-butyl acrylate, 0.6 parts of allyl methacrylate, 0.1 parts of 1,3-butylene glycol dimethacrylate and 0.1 parts of t-butyl hydroperoxide was added. A stream of nitrogen gas was let to pass through the reaction vessel to thereby replace the atmosphere with nitrogen, and the internal temperature was raised to 60° C. When the internal temperature reached 60° C., an aqueous solution composed of 0.000075 parts of ferrous sulfate heptahydrate, 0.00023 parts of disodium ethylenediaminetetraacetate, 0.2 parts of sodium formaldehyde sulfoxylate and 10 parts of ion-exchanged water was added to initiate radical polymerization. Following confirmation of heat generation from the polymerization, the jacket temperature was set to 75° C., and the polymerization was continued until heat generated by the polymerization reaction could no longer be detected. This state was further maintained for 1 hour to obtain a composite rubber in which polybutadiene and a polybutyl acrylate rubber were compounded (radical polymerization step). The volume average particle size of the obtained composite rubber was 280 nm.

After the liquid temperature inside the reaction vessel had dropped to 70° C., 0.60 parts of a 5% sodium pyrophosphate aqueous solution was added as a solid. After controlling at an internal temperature of 70° C., 0.60 parts of the acid group-containing copolymer latex (K) was added as a solid, and the resulting mixture was stirred for 30 minutes for expansion to obtain a latex of a composite rubber-like polymer (expansion step). The volume average particle size of the composite rubber-like polymer in the obtained latex was 300 nm, and the gel content was 83%.

An aqueous solution composed of 0.001 parts of ferrous sulfate heptahydrate, 0.003 parts of disodium ethylenediaminetetraacetate, 0.3 parts of Rongalite and 10 parts of ion-exchanged water was added to the latex of the composite rubber-like polymer. Subsequently, a mixed solution composed of 10 parts of acrylonitrile, 30 parts of styrene and 0.18 parts of t-butyl hydroperoxide was added dropwise over the course of 80 minutes and polymerized. Following completion of the dropwise addition, a state at a temperature of 75° C. was held for 30 minutes, and then a mixture composed of 2.5 parts of acrylonitrile, 7.5 parts of styrene, 0.05 parts of t-butyl hydroperoxide and 0.02 parts of n-octylmercaptan was added dropwise over the course of 20 minutes and polymerized. Following completion of the dropwise addition, a state at a temperature of 75° C. was held for 30 minutes, and then 0.05 parts of cumene hydroperoxide was added thereto. The state at a temperature of 75° C. was further held for 30 minutes, followed by cooling, to obtain a latex of a butadiene/acrylic composite rubber-based graft copolymer (C-2) in which acrylonitrile and styrene were graft polymerized to a composite rubber-like polymer.

Subsequently, 150 parts of a 1% calcium acetate aqueous solution was heated to 60° C., and 100 parts of the latex of the graft copolymer (C-2) was gradually added dropwise thereinto and solidified. Further, the precipitate was separated, dehydrated, washed and then dried to obtain a graft copolymer (C-2).

Production Example 4: Production of Graft Copolymer (C-3)

A mixture composed of 190 parts of ion-exchanged water, 0.6 parts of dipotassium alkenyl succinate, 50 parts of n-butyl acrylate, 0.6 parts of allyl methacrylate, and 0.1 parts of t-butyl hydroperoxide was added in a reaction vessel fitted with a reagent injection container, a cooling tube, a jacket heater and a stirrer. A stream of nitrogen gas was let to pass through the reaction vessel to thereby replace the atmosphere with nitrogen, and the internal temperature was raised to 55° C. When the internal temperature reached 55° C., an aqueous solution composed of 0.0001 parts of ferrous sulfate heptahydrate, 0.0003 parts of disodium ethylenediaminetetraacetate, 0.2 parts of sodium formaldehyde sulfoxylate and 10 parts of ion-exchanged water was added to initiate radical polymerization. Following confirmation of heat generation from the polymerization, the jacket temperature was set to 75° C., and the polymerization was continued until heat generated by the polymerization reaction could no longer be detected, and this state was further maintained for 1 hour. The volume average particle size of the obtained rubber-like polymer was 100 nm.

After the liquid temperature inside the reaction vessel had dropped to 70° C., 0.6 parts of a 5% sodium pyrophosphate aqueous solution was added as a solid. After controlling at an internal temperature of 70° C., 1.2 parts of the acid group-containing copolymer latex (K) was added as a solid, and the resulting mixture was stirred for 30 minutes for expansion to obtain a latex of a rubber-like polymer. The volume average particle size of the rubber-like polymer in the obtained latex was 290 nm, and the gel content was 85%.

An aqueous solution composed of 0.001 parts of ferrous sulfate heptahydrate, 0.003 parts of disodium ethylenediaminetetraacetate, 0.3 parts of sodium formaldehyde sulfoxylate and 10 parts of ion-exchanged water was added to the latex of the obtained rubber-like polymer. Subsequently, a mixed solution composed of 15 parts of acrylonitrile, 35 parts of styrene and 0.225 parts of t-butyl hydroperoxide was added dropwise over the course of 100 minutes and polymerized. Following completion of the dropwise addition, a state at a temperature of 80° C. was held for 30 minutes, and then 0.05 parts of cumene hydroperoxide was added thereto. The state at a temperature of 75° C. was further held for 30 minutes, followed by cooling, to obtain a latex of a graft copolymer (C-3).

Subsequently, 100 parts of a 1.5% sulfuric acid aqueous solution was heated to 80° C., and 100 parts of the latex of the graft copolymer (C-3) was gradually added dropwise thereinto and solidified. Further, the precipitate was separated, dehydrated, washed and then dried to obtain a graft copolymer (C-3).

Other Thermoplastic Resin (D)

Production Example 5: Production of Other Thermoplastic Resin (D-1)

27 parts of acrylonitrile and 73 parts of styrene were polymerized by a known suspension polymerization method to obtain an acrylonitrile-styrene copolymer having a reduced viscosity of 0.61 dl/g as measured at 25° C. from an N,N-dimethylformamide solution. This was used as another thermoplastic resin (D-1).

Production Example 6: Production of Other Thermoplastic Resin (D-2)

19 parts of acrylonitrile, 53 parts of styrene and 28 parts of N-phenylmaleimide were polymerized by a known continuous solution polymerization method to obtain an acrylonitrile-styrene-N-phenylmaleimide terpolymer having a reduced viscosity of 0.65 dl/g as measured at 25° C. from an N,N-dimethylformamide solution. This was used as another thermoplastic resin (D-2).

Carbon Black (B)

(B-1): "RB-929955S" manufactured by ECCA Co., Ltd.
(B-2): "ABF-TT 2351-G" manufactured by Resino Color Industry Co., Ltd.
(B-3): "DBSP-3687 HC" manufactured by Maeda Industrial Chemicals Co., Ltd.
(B-4): "FW 285" manufactured by Orion Engineered Carbons GmbH.
(B-5): "BP 2000" manufactured by Cabot Japan K.K.
(B-6): "#44" manufactured by Mitsubishi Chemical Corporation.

Examples 1 to 8, Comparative Examples 1 to 5

The graft copolymer (C), another thermoplastic resin (D) and the carbon black (B) of the types and quantities shown in Tables 1 to 3, 1 part of ethylene bisstearyl amide, 0.2 parts of silicone oil SH 200 (manufactured by Dow Corning Toray Co., Ltd.), 0.2 parts of ADK STAB AO-60 (manufactured by ADEKA Corporation) and 0.4 parts of ADK STAB LA-57 (manufactured by ADEKA Corporation) were mixed using a Henschel mixer. The obtained mixture was melt-kneaded at 250° C. using a screw type extruder (TEX-30α type twin screw extruder, manufactured by The Japan Steel Works, Ltd.) and then pelletized with a pelletizer to obtain a pelletized thermoplastic resin composition.

With respect to the obtained thermoplastic resin composition, the impact resistance, the appearance after laser welding, the appearance after vibration welding, the appearance after hot plate welding and the color tone were evaluated by the aforementioned procedure. These results are shown in Tables 1 to 3.

Further, the properties (the volume average particle size, the proportion of secondary particles having a particle size of 800 nm or more, and the value of M determined from the particle size distribution) of the secondary particles of the carbon black (B) used in each example are also shown in Tables 1 to 3. The proportion of secondary particles having a particle size of 800 nm or more is expressed as "proportion of 800 nm or more".

TABLE 1

|  |  |  |  | Examples | | | |
|---|---|---|---|---|---|---|---|
|  |  |  |  | 1 | 2 | 3 | 4 |
| Blending [parts] | Thermoplastic resin (A) | Graft copolymer (C) | C-1 | 35 | 35 | 35 | 35 |
|  |  | Other thermoplastic resin (D) | D-1 | 30 | 30 | 30 | 30 |
|  |  |  | D-2 | 35 | 35 | 35 | 35 |
|  |  | Carbon black (B) | B-1 | 0.50 | — | — | — |
|  |  |  | B-2 | — | 0.50 | — | — |
|  |  |  | B-3 | — | — | 0.50 | — |
|  |  |  | B-4 | — | — | — | 0.50 |
| Carbon black (B) secondary particles | | Proportion of 800 nm or more (%) | | 1.1 | 18.9 | 19.3 | 0.1 |
|  |  | Volume average particle size (nm) | | 210 | 510 | 470 | 270 |
|  |  | M | | 1.59 | 1.68 | 2.37 | 0.99 |
| Physical properties | Charpy impact strength | | [kJ/m$^2$] | 9.2 | 9.3 | 9.2 | 9.4 |
|  | Appearance after laser welding | | — | A | A | A | A |
|  | Appearance after vibration welding | | — | A | A | A | A |
|  | Appearance after hot plate welding | | — | A | A | A | A |
|  | Color tone | | L* | 28.3 | 28.1 | 28.0 | 29.5 |

TABLE 2

|  |  |  |  | Examples | | | |
|---|---|---|---|---|---|---|---|
|  |  |  |  | 5 | 6 | 7 | 8 |
| Blending [parts] | Thermoplastic resin (A) | Graft copolymer (C) | C-1 | 35 | 35 | — | — |
|  |  |  | C-2 | — | — | 35 | — |
|  |  |  | C-3 | — | — | — | 35 |
|  |  | Other thermoplastic resin (D) | D-1 | 30 | 30 | 30 | 30 |
|  |  |  | D-2 | 35 | 35 | 35 | 35 |
|  |  | Carbon black (B) | B-1 | 0.20 | 2.50 | 0.50 | 0.50 |
| Carbon black (B) secondary particles | Proportion of 800 nm or more (%) |  |  | 1.1 | 1.1 | 1.1 | 1.1 |
|  | Volume average particle size (nm) |  |  | 210 | 210 | 210 | 210 |
|  | M |  |  | 1.59 | 1.59 | 1.59 | 1.59 |
| Physical properties | Charpy impact strength |  | [kJ/m$^2$] | 9.6 | 8.8 | 8.2 | 6.8 |
|  | Appearance after laser welding |  | — | B | B | A | A |
|  | Appearance after vibration welding |  | — | A | A | A | A |
|  | Appearance after hot plate welding |  | — | A | A | A | A |
|  | Color tone |  | L* | 31.4 | 24.2 | 28.9 | 28.1 |

TABLE 3

|  |  |  |  | Comparative Examples | | | | |
|---|---|---|---|---|---|---|---|---|
|  |  |  |  | 1 | 2 | 3 | 4 | 5 |
| Blending [parts] | Thermoplastic resin (A) | Graft copolymer (C) | C-1 | 35 | 35 | 35 | 35 | — |
|  |  | Other thermoplastic resin (D) | D-1 | 30 | 30 | 30 | 30 | 45 |
|  |  |  | D-2 | 35 | 35 | 35 | 35 | 55 |
|  |  | Carbon black (B) | B-1 | — | — | 0.05 | 3.50 | 0.50 |
|  |  |  | B-5 | 0.50 | — | — | — | — |
|  |  |  | B-6 | — | 0.50 | — | — | — |
| Carbon black (B) secondary particles | Proportion of 800 nm or more (%) |  |  | 49.2 | 0 | 1.1 | 1.1 | 1.1 |
|  | Volume average particle size (nm) |  |  | 670 | 70 | 210 | 210 | 210 |
|  | M |  |  | 1.40 | 1.40 | 1.59 | 1.59 | 1.59 |
| Physical properties | Charpy impact strength |  | [kJ/m$^2$] | 9.0 | 9.0 | 9.6 | 8.2 | 2.0 |
|  | Appearance after laser welding |  | — | C | C | C | C | C |
|  | Appearance after vibration welding |  | — | A | A | A | B | C |
|  | Appearance after hot plate welding |  | — | A | A | A | B | C |
|  | Color tone |  | L* | 32.4 | 28.4 | 37.5 | 22.3 | 23.3 |

As shown in Tables 1 to 3, molded articles excellent in impact resistance, appearance after laser welding, appearance after vibration welding, appearance after hot plate welding and color tone were obtained from the thermoplastic resin compositions obtained in each of the examples.

On the other hand, in each of the comparative examples, the result was inferior in any one or more properties of impact resistance, appearance after laser welding, appearance after vibration welding, appearance after hot plate welding and color tone of the molded article.

More specifically, in the case of Comparative Example 1, since the proportion of secondary particles having a particle size of 800 nm or more with respect to the entire secondary particles of the carbon black (B) was 20% or more, the appearance after laser welding was inferior.

In the case of Comparative Example 2, since the volume average particle size of the secondary particles of the carbon black (B) was less than 200 nm, the appearance after laser welding was inferior.

In the case of Comparative Example 3, since the content of the carbon black (B) was small, the appearance after laser welding and color tone were inferior.

In the case of Comparative Example 4, since the content of the carbon black (B) was large, the impact resistance and appearance after laser welding were inferior.

In the case of Comparative Example 5, since the graft copolymer (C) was not contained, impact resistance, appearance after laser welding, appearance after vibration welding and appearance after hot plate welding were inferior.

INDUSTRIAL APPLICABILITY

According to the present invention, it is possible to provide a thermoplastic resin composition which is excellent in color tone and appearance after laser welding, vibration welding or hot plate welding, and is also capable of obtaining a molded article having a sufficient impact resistance as a resin member. Especially, the balance between the color tone and the appearance after laser welding of the molded article is of an extremely high level that has not been obtainable using conventionally known thermoplastic resin compositions, and the applicability as parts for vehicles such as lighting equipment, interior parts and exterior parts, OA equipment and parts for household electrical appliances, medical instruments and various industrial materials is excellent.

The invention claimed is:

1. A thermoplastic resin composition comprising:
a thermoplastic resin (A); and
carbon black (B),
wherein said thermoplastic resin (A) comprises a graft copolymer (C) in which a vinyl-based polymer is grafted to a rubber-like polymer,
said carbon black (B) has a volume average particle size of secondary particles of 200 nm or more, and a proportion of secondary particles having a particle size of 800 nm or more with respect to the entire secondary particles of less than 20% by volume, and a content of said carbon black (B) is from 0.1 to 3.0 parts by mass with respect to 100 parts by mass of said thermoplastic resin (A).

2. The thermoplastic resin composition according to claim 1, wherein when a particle size at which a cumulative value in a particle size distribution based on volume of said carbon black (B) becomes 10% is defined as a 10% cumulative particle size (d10), a particle size at which said cumulative value becomes 50% is defined as a 50% cumulative particle size (d50), and a particle size at which said cumulative value becomes 90% is defined as a 90% cumulative particle size (d90), M obtained by the following formula (1) satisfies the following formula (2):

$$M=(d90-d10)/d50 \quad (1);$$

$$1.5 \leq M \leq 2.5 \quad (2).$$

3. A molded article using the thermoplastic resin composition according to claim 1.

* * * * *